(12) United States Patent
Quan et al.

(10) Patent No.: US 7,124,943 B2
(45) Date of Patent: Oct. 24, 2006

(54) RFID SYSTEM HAVING A FIELD REPROGRAMMABLE RFID READER

(75) Inventors: Ralph W. Quan, Broomfield, CO (US); Ryan N. Milbrandt, Lakewood, CO (US)

(73) Assignee: Assa Abloy Identification Technology Group AB, Stockholm (SE)

( * ) Notice: Subject to any disclaimer, the term of this patent is extended or adjusted under 35 U.S.C. 154(b) by 143 days.

(21) Appl. No.: 10/949,175

(22) Filed: Sep. 24, 2004

(65) Prior Publication Data
US 2006/0065730 A1  Mar. 30, 2006

(51) Int. Cl.
*G06K 7/08* (2006.01)
(52) U.S. Cl. .................... 235/451; 340/10.1
(58) Field of Classification Search ........... 235/451, 235/472.01, 472.02, 472.03; 705/14; 380/45, 380/15; 340/572.1, 10.1
See application file for complete search history.

(56) References Cited

U.S. PATENT DOCUMENTS

| | | | |
|---|---|---|---|
| 4,730,188 A | 3/1988 | Milheiser | |
| 5,347,263 A | 9/1994 | Carroll et al. | |
| 5,541,574 A | 7/1996 | Lowe et al. | |
| 6,476,708 B1 | 11/2002 | Johnson | |
| 6,677,852 B1 | 1/2004 | Landt | |
| 2002/0044655 A1* | 4/2002 | Applebaum | 380/45 |
| 2006/0047570 A1* | 3/2006 | Lenderking et al. | 705/14 |

* cited by examiner

*Primary Examiner*—Jared J. Fureman
*Assistant Examiner*—Kristy A. Haupt
(74) *Attorney, Agent, or Firm*—Rodney F. Brown

(57) ABSTRACT

An RFID system includes a first RFID reader storing old reader programming, a plurality of RFID administrator transponders, and new reader programming. The new reader programming is divided into a plurality of segments. Each RFID administrator transponder has an administrator transponder memory, which stores a new revision identifier correlated to the new programming, a different segment of new reader programming, and a correlated programming segment identifier. The RFID system further includes first, second and third writing means. The first writing means writes the segment of new reader programming stored in each administrator transponder memory to the first RFID reader, thereby enabling the first RFID reader to reprogram itself with the new reader programming. The second writing means writes one of the segments of new reader programming stored in the first RFID reader to a user transponder memory. The third writing means writes the segment of new reader programming stored in the user transponder memory to one or more additional RFID readers in the RFID system in response to the new revision identifier and correlated programming segment identifier, thereby enabling each of the additional RFID readers to reprogram itself with the new reader programming.

50 Claims, 4 Drawing Sheets

RFID SYSTEM HAVING A FIELD REPROGRAMMABLE RFID READER

TECHNICAL FIELD

The present invention relates generally to radio frequency identification (RFID) systems, and more particularly to an RFID system having one or more field reprogrammable RFD readers and to a secure and efficient method for field reprogramming the RFID readers.

BACKGROUND OF THE INVENTION

Radio frequency identification (RFID) systems generally consist of one or more RFID readers and a plurality of RFID transponders, which are commonly termed credentials. The RFID transponder is an active or passive radio frequency communication device, which is directly attached to or embedded in an article to be identified or otherwise characterized by the RFID reader, or which is alternatively embedded in a portable substrate, such as a card, keyfob, tag, or the like, carried by a person or an article to be identified or otherwise characterized by the RFID reader. Exemplary RFID systems are disclosed in U.S. Pat. No. 4,730,188 to Milheiser (the '188 patent), U.S. Pat. No. 5,541,574 to Lowe et al. (the '574 patent), and U.S. Pat. No. 5,347,263 to Carroll et al. (the '263 patent), all of which are incorporated herein by reference.

A passive RFID transponder is dependent on the host RFID reader as its power supply. The host RFID reader "excites" or powers up the passive RFID transponder by transmitting high voltage excitation signals into the space surrounding the RFID reader, which are received by the RFID transponder when it is near, but not necessarily in contact with, the RFID reader. The excitation signals from the RFID reader provide the operating power for the circuitry of the recipient RFID transponder. In contrast, an active RFID transponder is not dependent on the RFID reader as its power supply, but is instead powered up by its own internal power source, such as a battery. Once the RFID transponder is powered up, the RFID transponder communicates information, such as identity data or other characterizing data stored in the memory of the RFID transponder, to the RFID reader and the RFID reader can likewise communicate information back to the RFID transponder without the RFID reader and RFID transponder coming in contact with one another.

The powered up RFID transponder communicates with the RFID reader by generating transponder data signals within the circuitry of the RFID transponder and transmitting the transponder data signals in the form of electromagnetic waves into the surrounding space occupied by the RFID reader. The RFID reader contains its own circuitry as well as its own reader programming, which are cooperatively designed to "read" the data contained in the transponder data signals received from the RFID transponder. It is noted that the reader circuitry and programming are typically significantly larger and more complex than the RFID transponder due to the expanded functional requirements of the RFID reader in comparison to the RFID transponder.

An essential feature of all RFID systems is that all RFID transponders and readers of a given system are sufficiently compatible to effectively communicate with one another. Compatibility is achieved in part by specifying the carrier frequency at which data signals are communicated between the RFID transponders and readers of the RFID system. There are currently two standard carrier frequencies available to RFID systems. RFID systems, which employ RFID transponders of the type conventionally termed proximity cards or proximity tags, typically communicate by means of data signals at a carrier frequency within a range of 100 to 150 kHz. This carrier frequency range is nominally referred to herein as 125 kHz carrier frequency and is deemed a low frequency. In contrast, RFID systems, which employ RFID transponders of the type conventionally termed smart cards, typically communicate by means of data signals at a higher frequency of 13.56 MHz.

At present there are many manufacturers of RFID transponders and readers. An ongoing industry-wide effort exists to further standardize RFID systems so that there is greater compatibility between RFID transponders and readers of different manufacturers. The overall objective is to more readily enable system designers and administrators to operatively integrate RFID transponders and readers of different manufacturers within the same RFID system. Examples of industry-wide standardization are ISO standards 15693 and 14443 which standardize certain aspects of RFID transponders operating at 13.56 MHz. Despite such standardization efforts, operation of most RFID systems remains dependent to some extent on proprietary programming. As a result, it remains a significant challenge to manufacture an RFID reader, which is compatible with RFID transponders from different manufacturers. The challenge is particularly acute when operation of the RFID transponders of each manufacturer are adapted to a unique set of proprietary commands, which can change over time in response to the evolving requirements for RFID systems.

While it is relatively inexpensive to periodically replace RFID transponders in an RFID system with newly-developed upgraded RFID transponders having more advanced capabilities, the same is not true for the RFID readers because of the substantial unit-cost differential between RFID readers and transponders. Thus, it is oftentimes not economically feasible to replace the RFID readers of an RFID system in response to RFID transponder upgrades. As a result, system administrators may not be able, from a cost-effectiveness standpoint, to avail themselves of upgraded RFID transponders, if the upgraded RFID transponders are incompatible with the existing RFID readers and implementation of the upgraded RFID transponders would require replacement of the existing RFID readers.

One solution to the compatibility problem is to design RFID readers, which can be periodically reprogrammed, rendering the RFID reader compatible with newly-developed upgraded RFID transponders having advanced capabilities. Reprogramming the RFID readers in these cases advantageously avoids the cost of replacing the RFID readers in their entirety. Reprogrammable RFID readers can also provide a solution to the problem of maintaining RFID system security after internal programming, such as encryption keys, has been compromised. Reprogrammable RFID readers provide a system administrator with a means for changing the compromised programming. In sum, it is apparent that reprogrammable RFID readers provide an effective, low-cost solution for maintaining the capabilities and security of an RFID system.

A relatively common application for RFID systems is to identify and authorize a person desiring access to a secured site, such as a room or other compartment, through a security entrance. The RFID reader of an RFID system employed in an access control application is fixedly positioned outside the security entrance to the secured site. The security entrance may, for example, be a security door having a mechanical lock operable by an electronic controller, which is integral with or otherwise in communication with the RFID reader. The RFID reader is typically mounted on a wall adjacent to the door or is affixed to the door itself. A user desiring access to the secured site is required to carry an ID card, which has a passive RFID transponder embedded therein. When the user approaches the security entrance, the user positions the ID card within the range of the excitation signals from the RFID reader, which elicit a responsive data signal from the RFID transponder embedded in the ID card. The RFID reader reads the resulting transponder data signal to determine if the user is a person authorized to access the secured site. If the RFID reader determines that the user is properly authorized, the RFID reader communicates an authorization signal to the electronic controller. The controller directs the mechanical lock to transition from a locked position to an unlocked position, which enables the user to open the door or which otherwise opens the door, permitting the user access to the secured site through the security entrance.

RFID systems for access control applications are oftentimes characterized by a relatively large number of RFID readers, which can be distributed across many geographically disparate and/or remote locations. RFID readers positioned in locations which lack access to an ac power line, as disclosed in U.S. Pat. No. 6,476,708 to Johnson (the '708 patent), can be powered by a self-contained portable power source within the RFID reader, such as a small disposable or rechargeable battery. If an ac power line is available, the RFID reader frequently interfaces with the ac power line via a control panel which is hard-wired to the RFID reader and the ac power line. RFID readers for access control applications are also generally housed in a secure shell or other secure enclosure to render the internal circuitry physically inaccessible to the user or unauthorized individuals and prevent tampering. In addition, RFID readers, which are coupled with a mechanical lock and electronic controller, are often physically integrated with the lock mechanism in a common housing.

The particular characteristics of RFID readers used in access control applications complicate the task of reprogramming the RFID reader. For example, the time and expense of dispatching a system administrator to each of many geographically spread out RFID readers within an RFID system to individually reprogram each RFID reader can be relatively high.

The most common method for reprogramming RFID readers used for access control applications is to connect the RFID reader directly to a computer, such as a PC, and input the new reader programming to the RFID reader via the computer. This method often requires the steps of disconnecting the RFID reader from a control panel interface, removing the RFID reader from its mounting or security shell, and/or disassembling an associated lock mechanism having the RFID reader integral therewith. Each of these steps is quite labor intensive and can significantly add to the cost of reprogramming the RFID reader. Another problem which can be faced when reprogramming a significant number of RFID readers installed at a secured facility is that, for security reasons, only one or a few of the RFID readers at the perimeter of a facility may subsequently be accessible to the system administrator, while the remaining RFID readers within the facility have become inaccessible to the system administrator.

As such, the present invention recognizes a need for an RFID system having one or more field reprogrammable RFID readers and a need for an improved method of field reprogramming the one or more of the RFID readers.

Accordingly, it is generally an object of the present invention to provide an RFID system having one or more field reprogrammable RFID readers. It is generally another object of the present invention to provide a method for field reprogramming one or more of the RFID readers. More particularly, it is an object of the present invention to provide an RFID system including a plurality of RFID readers and a method for reprogramming the plurality of RFID readers, which does not require a system administrator to physically access each RFID reader. It is a further object of the present invention to provide an RFID system including a plurality of RFID readers and a method for reprogramming the plurality of RFID readers, which does not require a system administrator to individually reprogram each RFID reader.

It is another object of the present invention to provide an RFID system including an RFID reader and a method for reprogramming the RFID reader, which does not require a computer to input the new reader programming to the RFID reader. It is yet another object of the present invention to provide an RFID system including an RFID reader and a method for reprogramming the RFID reader, which is relatively secure. It is still a further object of the present invention to provide an RFID system including an RFID reader and a method for reprogramming an RFID reader, which is relatively cost-effective. It is still another object of the present invention to provide an RFID system including an RFID reader and a method for reprogramming the RFID reader, which is relatively less intrusive and/or less labor intensive than known methods and, more particularly, which eliminates or reduces the degree of physical disassembly or other physical effort required. It is yet a further object of the present invention to provide an RFID system including an RFID reader and a method for reprogramming the RFID reader, which can be completed within a predictable acceptable time period. It is another object of the present invention to provide an RFID system including an RFID reader and a method for reprogramming the RFID reader, which has an inherently low risk of error.

These objects and others are accomplished in accordance with the invention described hereafter.

SUMMARY OF THE INVENTION

The present invention is an RFID system comprising a first RFID reader which stores old reader programming, a plurality of RFID administrator transponders, and new reader programming. The new reader programming has a new revision identifier correlated to it and is divided into a plurality of segments. Each segment of new reader programming has a programming segment identifier correlated to it. Each of the plurality of RFID administrator transponders has an administrator transponder memory, which includes a revision identification and propagation section and a segment content and security section. The revision identification and propagation section stores the new revision identifier. The segment content and security section of each of the plurality of RFID administrator transponders stores a different segment of new reader programming. The administrator transponder memory stores the correlated programming segment identifier of the stored segment of new reader programming.

The RFID system further comprises one or more additional RFID readers, a plurality of user transponders, and first, second and third writing means. The one or more additional RFID readers store the old reader programming and each of the plurality of user transponders has a user transponder memory, which includes a user identification section storing user identification data, a revision identification and propagation section, and a segment content and security section.

The first writing means is for writing the new revision identifier, the segment of new reader programming and the correlated programming segment identifier stored in the administrator transponder memory to the first RFID reader. The first writing means enables the first RFID reader to reprogram itself with all the segments of new reader programming replacing some or all of the old reader programming stored in the first RFID reader. The second writing means is for writing the new revision identifier stored in the first RFID reader to the revision identification and propagation section of the user transponder memory, for writing one of the plurality of segments of new reader programming stored in the first RFID reader to the segment content and security section of the user transponder memory, and for writing the correlated programming segment identifier stored in the first RFID reader to the user transponder memory. The third writing means is for writing the segment of new reader programming stored in the user transponder memory to the one or more additional RFID readers in response to the one or more additional RFID readers reading the new revision identifier and the correlated programming segment identifier. The third writing means enables each of the one or more additional RFID readers to reprogram itself with all the segments of new reader programming replacing some or all of the old reader programming stored in the one or more additional RFID readers.

In accordance with a number of preferred embodiments, the first writing means includes an administrator transponder antenna and a first RFID reader antenna, the second writing means includes a user transponder antenna and a first RFID reader antenna, and the third writing means includes a user transponder antenna and an additional RFID reader antenna. The third writing means is additionally for writing a programming segment request correlated to one of the plurality of segments of new programming to the revision identification and propagation section of the user transponder memory. This step is in response to the one or more additional RFID readers comparing the programming segment identifier stored in the user transponder memory and the programming segment identifier stored in the one or more additional RFID readers. The second writing means is additionally for writing the segment of new reader programming correlated to the programming segment request and stored in the first RFID reader to the user transponder memory. This step is in response to the first RFID reader comparing the programming segment identifier stored in the first RFID reader and the programming segment request stored in the user transponder memory.

The present invention is also a method for reprogramming an RFID reader in an RFID system. The method comprises storing old reader programming in a first RFID reader. New reader programming is provided which has a new revision identifier correlated thereto. The new reader programming is divided into a plurality of segments and each segment of new reader programming has a programming segment identifier correlated thereto. The new revision identifier, the plurality of segments of new reader programming, and the correlated programming segment identifiers are stored in a plurality of administrator transponders. In particular, the new revision identifier and a different programming segment and correlated programming segment identifier are stored in each of the plurality of administrator transponders. A sufficient number of administrator transponders are preferably provided to store all the plurality of segments of new reader programming.

Each programming segment and correlated programming segment identifier stored in each of the plurality of administrator transponders is written to the first RFID reader in response to the first RFID reader reading the new revision storage identifier. Accordingly, the first RFID reader is reprogrammed with all the segments of new reader programming replacing some or all of the old reader programming.

The method preferably further comprises storing user identification data in a user transponder and writing the new revision identifier, one of the plurality of segments of new reader programming, and the correlated programming segment identifier stored in the first RFID reader to the user transponder. The segment of new reader programming and the correlated programming segment identifier stored in the user transponder is written to the second RFID reader in response to the second RFID reader reading the new revision identifier and the correlated programming segment identifier.

The user transponder writing step is preferably repeated to write the new revision identifier, a different one of the plurality of segments of new reader programming, and the correlated programming segment identifier to the same user transponder or to a different user transponder. The second RFID reader writing step is also repeated to write the different stored segment of new reader programming and the correlated programming segment identifier to the second RFID reader in response to the second RFID reader reading the new revision identifier and the correlated programming segment identifier. The user transponder and second RFID reader writing steps are preferably repeated until all the segments of new reader programming are written to the second RFID reader, thereby reprogramming the second RFID reader with the new reader programming replacing some or all of the old reader programming.

In accordance with a preferred embodiment, a programming segment request correlated to one of the plurality of segments of new programming is written to the user transponder in response to a second RFID reader comparing the programming segment identifier stored in the user transponder and a programming segment identifier stored in the second RFID reader. The segment of new reader programming correlated to the programming segment request and stored in an other RFID reader of the RFID system other than the second RFID reader is written to the user transponder in response to the other RFID reader comparing a programming segment identifier stored in the other RFID reader and the programming segment request stored in the user transponder. Thereafter, the segment of new reader programming correlated to the programming segment request stored in the user transponder is written to the second RFID reader.

The present invention will be further understood from the drawings and the following detailed description.

DESCRIPTION OF PREFERRED EMBODIMENTS

Figure 1:
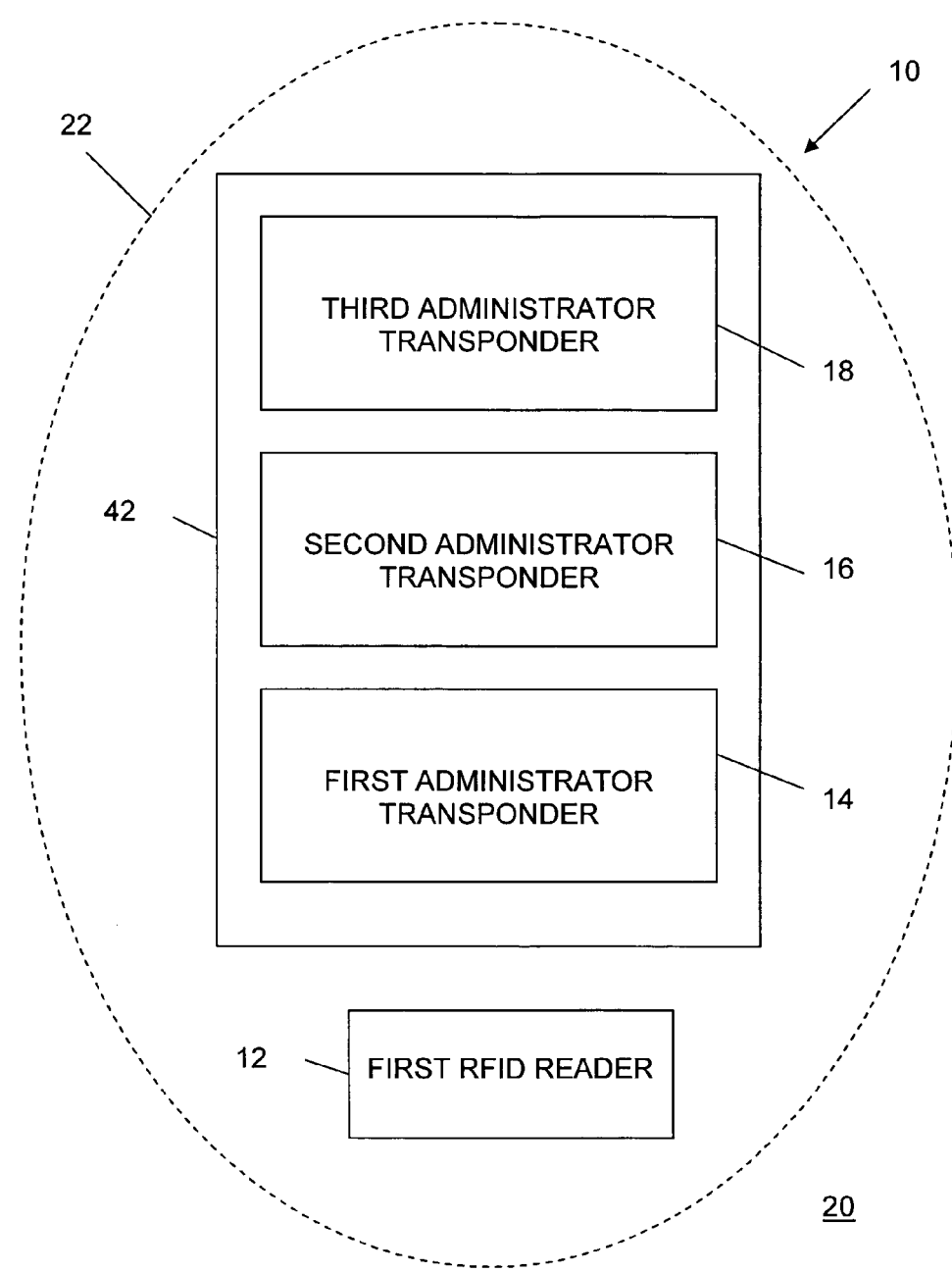
FIG. 1 is a block diagram of an RFID system while the system is performing a system reprogramming initiation mode of operation in accordance with the method of the present invention.

Referring initially to FIG. 1, a conceptualized embodiment an RFID system having utility in the method of the present invention is shown and generally designated 10. The RFID system 10 comprises an RFID reader 12, a first RFID transponder 14, a second RFID transponder 16, and a third RFID transponder 18. The RFID transponders 14, 16, 18 are either active devices, which contain an internal electrical power source, or passive devices, which are not physically coupled with an electrical power supply. In the case of active devices, the electrical power required to operate the RFID transponders 14, 16, 18 is provided by the internal electrical power source, such as a battery. In the case of passive devices, the electrical power required to operate the RFID transponders 14, 16, 18 is indirectly supplied to the RFID transponders 14, 16, 18 by electromagnetic waves, which are periodically propagated through open space 20 to the RFID transponders 14, 16, 18 from the RFID reader 12. Whether the RFID transponders 14, 16, 18 are active or passive, communication between the RFID transponders 14, 16, 18 and the RFID reader 12 is only possible when the RFID transponders 14, 16, 18 and RFID reader 12 are within a certain range of one another, which is dependent on the characteristics of both the RFID reader 12 and the RFID transponders 14, 16, 18. The dashed line 22 is a conceptualized representation of the communication range of the RFID reader 12 with respect to the RFID transponders 14, 16, 18.

Although details of the RFID transponders 14, 16, 18 are not shown, in accordance with a preferred embodiment, the basic conceptual design of each of the RFID transponders 14, 16, 18 is conventional. A typical conventional conceptual design for an RFID transponder includes an integrated circuit (IC) (also termed a transponder chip) and an antenna coupled with the IC, which performs both the receiving and transmitting functions of the RFID transponder. Such an antenna is termed a dual-function antenna. Alternatively, the RFID transponder can include two separate antennas, i.e., a receiving antenna and a transmitting antenna, rather than a single dual-function antenna. The two antennas separately perform the receiving and transmitting functions of the RFID transponder.

In addition to the transponder IC and antenna, the RFID transponder optionally includes a tuning capacitor coupled with the transponder IC and antenna. The tuning capacitor, in cooperation with the antenna, determines the carrier frequency of the RFID transponder. In particular, the practitioner sets the carrier frequency of the RFID transponder by selecting an antenna and tuning capacitor for the RFID transponder, which are tuned to either 125 kHz or 13.56 MHz. The transponder IC performs essentially all remaining functions of the RFID transponder not encompassed by the antenna and tuning capacitor, including transponder control functions, data storage functions, and any data processing functions required of the RFID transponder, such as disclosed in the '188 and '574 patents. In the case where the RFID transponder is an active device, the RFID transponder further includes an internal battery.

In accordance with one embodiment, the RFID transponders 14, 16, 18 are more specifically active or passive smart cards, wherein each transponder is embedded in a separate wallet-sized card and the transponder antenna and tuning capacitor are tuned to 13.56 MHz. It is noted that the IC of a smart card has significantly expanded functional capabilities relative to proximity-type transponders.

Smart cards are but one example of RFID transponders having utility in the RFID system 10. It is understood that the present invention is not limited to any one specific transponder design, but is generally applicable to most conventional designs of RFID transponders having utility in RFID systems including the different transponder designs shown and described in the '188, '574, and '263 patents. It is further understood that the RFID system 10 is not limited to RFID systems having three RFID transponders and only one RFID reader as shown. In practice, RFID systems having utility in the present invention typically include any number of compatible RFID transponders from one or more and also often include more than one compatible RFID reader.

Details of the RFID reader 12 are likewise not shown, but, in accordance with a preferred embodiment, the basic conceptual design of the RFID reader 12 is conventional. A typical conventional conceptual design for an RFID reader includes a signal generator, receiver electronics, a microcontroller, a memory (preferably included within the microcontroller), a power supply, and an antenna and correspondingly paired tuning capacitor. As in the case of the RFID transponder, the reader antenna is a dual-function antenna, which performs both the receiving and transmitting functions of the RFID reader. Alternatively, the RFID reader can include two separate antennas, i.e., a receiving antenna and a transmitting antenna, which separately perform the receiving and transmitting functions of the RFID reader. A microcontroller is generally defined herein to include substantially any processor sized to fit within a conventional RFID reader and having sufficient capabilities to perform the desired processing functions of the RFID reader.

The power supply is a finite electrical power source which is self-contained (i.e., internal) within the RFID reader, such as a relatively small portable battery consisting of one or more disposable dry cells or rechargeable cells, or alternatively the power supply is hard wired to an essentially infinite remote electrical power source, such as an electric utility. The signal generator includes conventional electronic components similar to those disclosed in the '188 patent and the '708 patent for generating relatively low energy electromagnetic waves termed "ring signals" or "detection signals" when operating in a transponder detection mode and for generating relatively high energy electromagnetic waves termed "excitation signals" when operating in a transponder excitation mode. The signal generator is coupled with the reader antenna and paired tuning capacitor to transmit detection and excitation signals from the signal generator through the open space 20 for reception by any nearby RFID transponders which are commonly tuned to same frequency as the RFID reader. Thus, in the case where the RFID transponders 14, 16, 18 are smart cards, the antenna and tuning capacitor of the RFID reader 12 are likewise tuned to 13.56 MHz.

The RFID reader 12 and RFID transponders 14, 16, 18 of the RFID system 10 are simultaneously operational only when the RFID transponders 14, 16, 18 are within the communication range 22 of the RFID reader 12. Since the range of the excitation signals transmitted from the RFID reader 12 is limited by size and power constraints on the RFID reader 12, the RFID reader 12 and RFID transponders 14, 16, 18 are oftentimes only operational when the RFID reader 12 and RFID transponders 14, 16, 18 are in relative proximity to one another. It is further noted that RFID readers in most conventional RFID systems used for access control applications are stationary (i.e., fixed and operable in a constant position) relative to the surrounding environment while the RFID transponders are portable (i.e., readily moved and operable at different positions) within the surrounding environment. As such, the user of the RFID system moves the portable RFID transponder into relative proximity with the stationary RFID reader to enable simultaneous operation of the both the RFID transponder and RFID reader. Nevertheless, the present invention is not limited to RFID systems for access control applications and, therefore, does not specify the portability or lack thereof of any of the RFID system components.

During conventional operation of an RFID reader, the RFID reader is initially in the transponder detection mode, wherein the signal generator periodically generates and transmits low power detection signals. Propagated detection signals returned to the RFID reader are monitored and evaluated by the RFID reader to detect RFID transponders. When an RFID transponder is moved to a proximal position such that the distance between the RFID reader and RFID transponder is within the communication range of the RFID reader, the RFID reader detects the RFID transponder. The communication range of the RFID reader is generally about 4 to 5 inches when the reader and transponder antennas are coaxially aligned. As a result, the RFID reader switches to the transponder excitation mode, wherein the signal generator begins generating a higher power excitation signal in the form of an electromagnetic wave, which has sufficient strength to power up and activate the RFID transponder.

Upon activation, the transponder IC generates a communication signal termed a transponder data signal, which contains readable information (i.e., digital data) copied or otherwise derived from the memory of the transponder IC. The transponder data signal is in the form of an electromagnetic wave like the excitation signal. It is noted that communication signals of RFID systems (i.e., excitation and transponder data signals) are typically termed radio frequency signals. However, the excitation and transponder data signals of the present invention are not limited exclusively to signals having specific frequencies within the narrow "radio frequency" range, as "radio frequency" is commonly defined for the radio communication industry. The RFID transponder transmits the transponder data signal into the open space of the external environment via the transponder antenna.

The present invention is generally an RFID system comprising one or more RFID readers and one or more RFID transponders, and is further a method for reprogramming the one or more RFID readers using the one or more RFID transponders. With continuing reference to FIG. 1, an example of an initiation mode of operation for the present reprogramming method is shown, wherein new reader programming is input to the RFID reader 12 by means of transponder data signals communicated from the RFID transponders 14, 16, 18 to the RFID reader 12. The RFID reader 12 subsequently reprograms itself with the new reader programming input to the RFID reader 12. The term "new" is used herein to denote essentially any data (including reader programming) not currently stored in the memory of the RFID reader 12 at the time the present method is initiated. The term "old" is used herein to denote essentially any data (including reader programming) stored in the memory of the RFID reader 12 at the time the present method is initiated. Old data, alternately termed "preexisting" data, often predates the new data with respect to its creation chronology.

In accordance with a preferred embodiment, the new reader programming is new firmware intended to replace old firmware stored in the programmable memory of the RFID reader 12. The new firmware is typically an upgrade of the old firmware, which enhances the operational capabilities of the RFID reader 12 (i.e., the ability of the RFID reader to communicate with RFID transponders) when the old firmware has become obsolete or is otherwise of diminished effectiveness. For example, the new firmware can facilitate the compatibility of the RFID reader 12 with previously incompatible RFID transponders produced by a manufacturer other than the manufacturer of the RFID reader 12 or with newly upgraded RFID transponders produced by the same manufacturer as the RFID reader 12. Alternatively, the new firmware can simply facilitate improved performance of an RFID system and, in particular, of an RFID reader where no substitutions, additions, upgrades, or other changes have been made to the RFID transponders employed in the RFID system.

In most cases, the memory storage capacity of a reader is significantly greater than the memory storage capacity of a transponder IC. Therefore, if the new reader programming is intended to replace old reader programming, which utilizes the entire memory storage capacity of the RFID reader, it is necessary to divide the new reader programming into segments, wherein each programming segment is sized less than or equal to the memory storage capacity of the transponder IC. For example, if a 13.56 MHz transponder IC has a memory storage capacity of 32 kilobits and a compatible RFID reader has a memory storage capacity of 32 kilobytes, at least 8 RFID transponders are required to completely reprogram the RFID reader.

In the exemplary case of FIG. 1, the memory storage capacity of the RFID reader 12 is substantially greater than the memory storage capacity of each RFID transponder 14, 16, 18, individually. In addition, the memory storage capacity of the RFID reader is greater than or equal to the size of the new reader programming desired to be input to the RFID reader 12, while the size of the new reader programming is less than or equal to the combined memory storage capacity of the RFID transponders 14, 16, 18.

The initiation mode proceeds by writing a first segment of the new reader programming to the memory of the first RFID transponder 14, writing a second segment of the new reader programming to the memory of the second RFID transponder 16, and writing a third segment of the new reader programming to the memory of the third RFID transponder 18. The first, second and third programming segments in sum constitute the entire cumulative new reader programming which is desired to be input to the RFID reader 12. Conventional methods and equipment for writing data, such as the new reader programming, to a transponder memory are well known to those skilled in the art. Although not a limitation of the invention, it is noted that the RFID transponders 14, 16, 18 are preferably outside the communication range 22 of the RFID reader 12, while the new reader programming is being written to the RFID transponders 14, 16, 18.

The RFID transponders 14, 16, 18 are all characterized as administrator transponders. An administrator transponder is intended to be primarily, if not solely, under the control and use of a person or persons designated as the system administrator, whose role is to maintain and/or upgrade the operating status of the RFID system 10. As such, the primary, if not sole, function of an administrator transponder is for maintaining and/or upgrading the RFID system 10 and typically does not perform any user identification functions.

Figure 3:
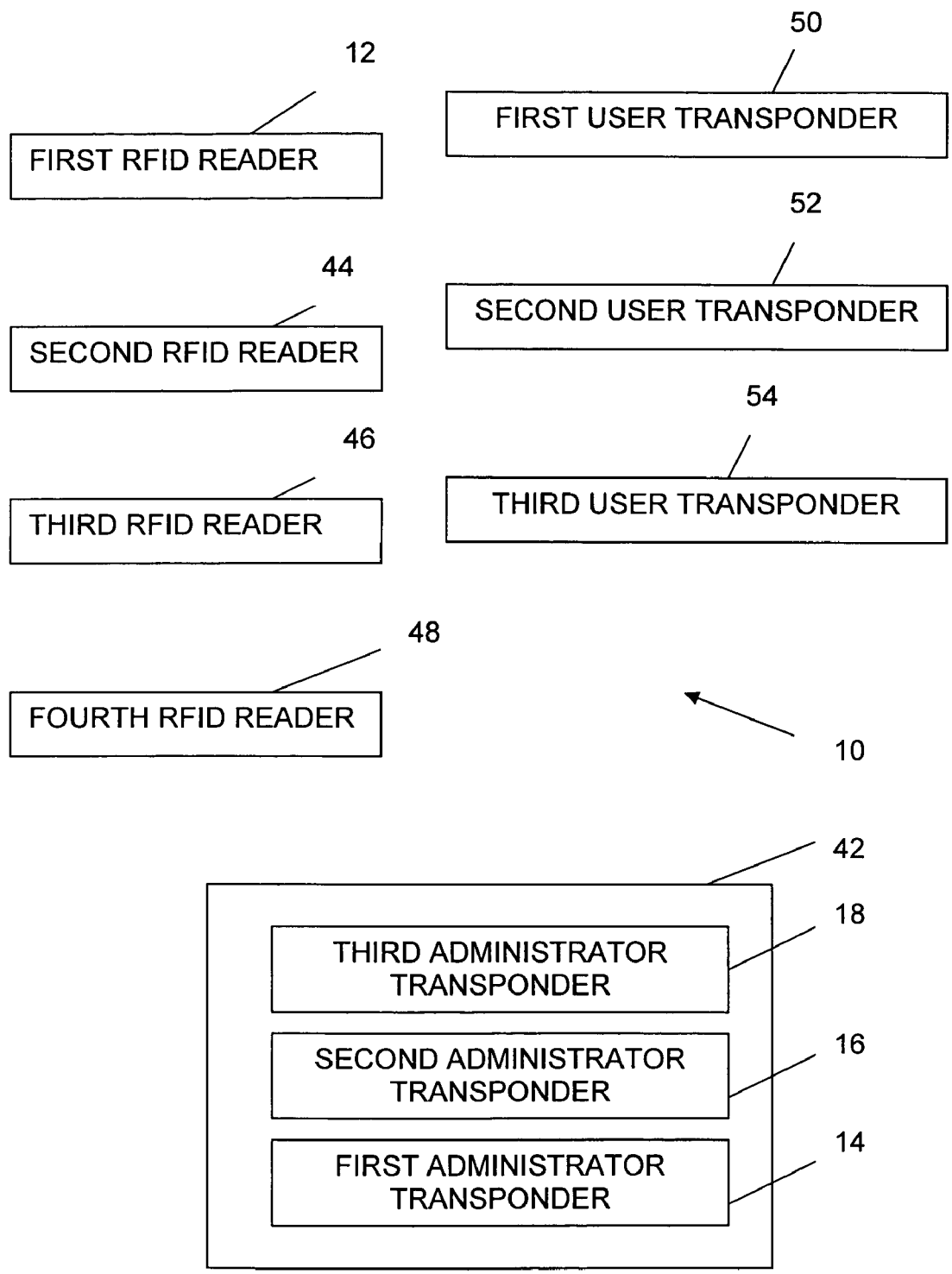
FIG. 3 is a more expansive block diagram of the RFID system than shown in FIG. 1 while the system is performing a system reprogramming propagation mode of operation in accordance with the method of the present invention.
Figure 4:
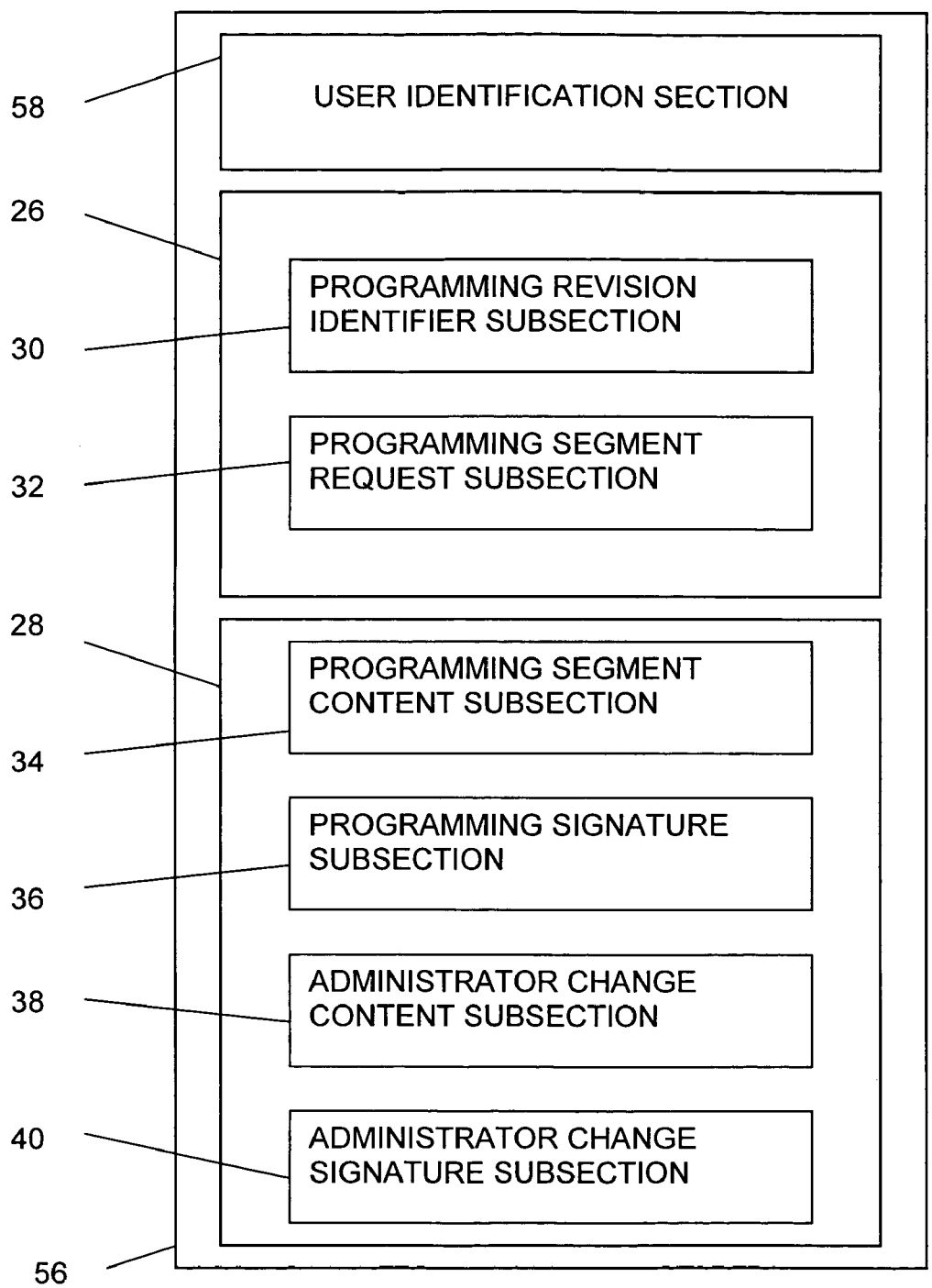
FIG. 4 is a block diagram of a portion of the memory of a user transponder having utility in the RFID system of FIG. 3.

Administrator transponders contrast with user transponders (not shown in FIG. 1), which are included within the RFID system 10 and are used in a system reprogramming propagation mode of operation described hereafter with reference to FIGS. 3 and 4. User transponders are each intended to be under the control and use of any person authorized to use the RFID system 10. As such, the primary function of a user transponder is for user identification and authorization by the RFID system 10. In accordance with the propagation mode, a user transponder also preferably has a secondary function of supplementing the administrator transponder functions.

Figure 2:
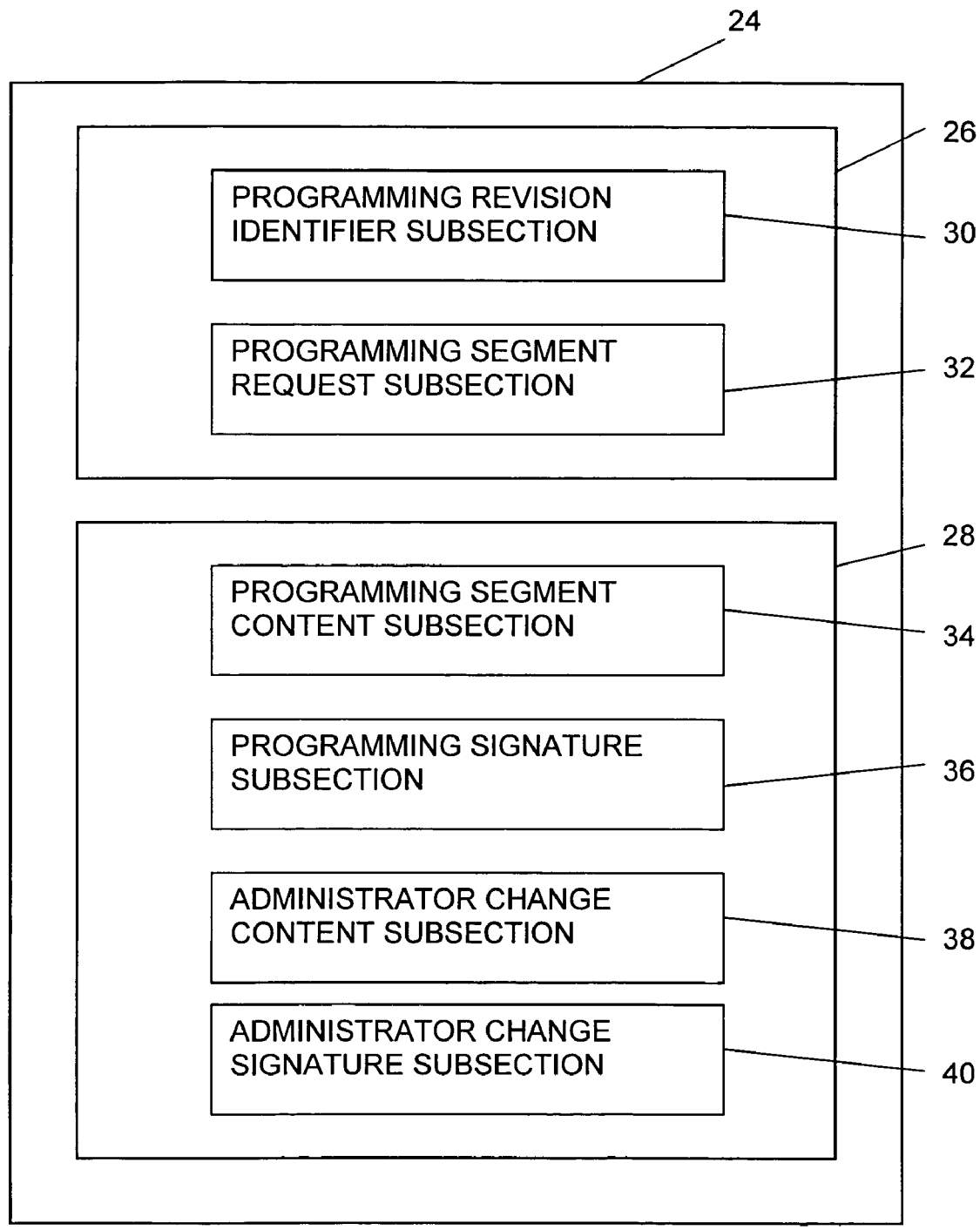
FIG. 2 is a block diagram of a portion of the memory of an administrator transponder having utility in the RFID system of FIG. 1.

The memory of each administrator transponder 14, 16, 18 preferably has essentially the same configuration. Accordingly, a representation of a portion of the memory of the administrator transponder 14 is generally designated 24 and described hereafter with reference to FIG. 2, it being understood that this description applies equally to the remaining administrator transponders 16, 18. Conceptually, the memory 24 of the administrator transponder 14 is deemed as being compartmentalized into a plurality of sections and subsections. In particular, the administrator transponder 14 comprises a revision identification and propagation section 26 and a segment content and security section 28. The revision identification and propagation section 26 comprises a programming revision identifier subsection 30 and a programming segment request subsection 32. The segment content and security section 28 comprises a programming segment content subsection 34, a programming signature subsection 36, an administrator change content subsection 38, and an administrator change signature subsection 40.

When a manufacturer distributes new reader programming to a customer for any reason (e.g., when upgraded user transponders are distributed to the customer, which require that the RFID reader 12 have new reader programming to communicate with the new user transponders of the manufacturer) the new reader programming is assigned a programming revision identifier. Conceptually, the programming revision identifier can simply be an alpha-numeric representation of the chronological sequence in which the new reader programming was created. For example, if the current new reader programming has a programming revision identifier "4", the current new reader programming follows three earlier versions of new reader programming having programming revision identifiers "1", "2" and "3". If later new reader programming is created after the current new reader programming, the later new reader programming is assigned a programming revision identifier "5" and so on.

If it is necessary to divide the new reader programming into segments due its overall size in order to enable storage of the entire new reader programming across the memories of several administrator transponders, a different segment of the new reader programming is stored in the memory of each administrator transponder. The present method is not limited to any particular criteria for determining where to divide the new reader programming. One criteria is to divide the new reader programming according to size. For example, the new reader programming can be divided such that each segment of new reader programming is sized approximately equally. Each segment can likewise be sized with correspondence with the memory capacity of each administrator transponder if desired, thereby minimizing the number of administrator transponders required to store the new reader programming. In any case, it is neither required nor necessarily desirable in the present method to divide the new reader programming such that each segment of new reader programming is operable in the RFID reader as a self-contained program module independent of the remaining segments of new reader programming. In most cases, each segment of new reader programming is only operable when recombined with all of the remaining segments in the RFID reader.

In the present example, the new reader programming is divided into three segments, wherein the first segment of new reader programming is stored in the first administrator transponder 14, the second segment is stored in the second administrator transponder 16, and the third segment is stored in the third administrator transponder 18. Although the content of the first, second and third segments are typically all different from one another, the programming revision identifier ("4" in the present example) remains common to all three segments and is stored in the programming revision identifier subsection 30 of each of the three administrator transponders 14, 16, 18.

The identity of a specific segment stored in the memory of a given administrator transponder is differentiated from the other segments stored in the remaining administrator transponders by a programming segment identifier, which is preferably unique to that particular segment. Conceptually, the programming segment identifier can simply be an alpha-numeric representation of the total number of segments into which the new reader programming is divided and the sequential location of the specific segment within the total number of segments. Thus, in the present example, where the new reader programming is divided into three segments corresponding to each of the administrator transponders 14, 16, 18, the first segment has the programming segment identifier "1 of 3", the second segment has the programming segment identifier "2 of 3", and the third segment has the programming segment identifier "3 of 3".

The actual first segment of the new reader programming is stored in the programming segment content subsection 34 of the first administrator transponder 14. The second segment of the new reader programming is stored in the programming segment content subsection 34 of the second administrator transponder 16. The third segment of the new reader programming is stored in the programming segment content subsection 34 of the third administrator transponder 18. The programming segment identifier is also preferably stored along with the actual new reader programming segment, which it identifies, in the programming segment content subsection of the respective administrator transponder. However, the present invention is not limited to a specific storage location for the programming segment identifier in the memory of a given administrator transponder. Nevertheless, it is most preferable to store the programming segment identifier in some accessible location of the memory of the same administrator transponder in which the actual segment identified by the programming segment identifier is stored.

For security purposes, the new reader programming is preferably encrypted and signed using a secure signature algorithm, such as the well-known Digital Signature Algorithm (DSA), to reduce the risk that the RFID reader 12 is reprogrammed with unauthorized programming. Accordingly, when the manufacturer develops the new reader programming for its customer, the manufacturer preferably encrypts and signs the new reader programming before distributing the new reader programming to its customers.

The new programming signature is subsequently stored in the programming signature subsection 36 of each of the administrator transponders 14, 16, 18.

In some cases, it is desirable for the system administrator to make a change to the old reader programming or other data stored in the memory of the RFID reader 12, which is not included in the new reader programming being input to the RFID reader 12. In other cases, it is desirable for the system administrator to make a change to the new reader programming itself before it is input to the RFID reader 12. The system administrator effects the change by writing the administrator change to one or more of the administrator transponders 14, 16, 18 (depending on the size and content of the administrator change) as an addendum to the new reader programming written to the administrator transponders 14, 16, 18. In still other cases, it is desirable for the system administrator to make a change to the old reader programming or other data stored in the memory of the RFID reader 12 when no new reader programming is being input to the RFID reader 12. The system administrator effects the change by writing the administrator change to one or more of the administrator transponders 14, 16, 18 (depending on the size of the administrator change) in the absence of any new reader programming being written to the administrator transponders 14, 16, 18. It is apparent that in all cases the administrator change is stored in the administrator change content subsection 38 of each administrator transponder 14, 16, 18, to which the change is written.

For security purposes, the administrator change is preferably encrypted and signed by the administrator in substantially the same manner as the new reader programming using a secure signature algorithm to likewise reduce the risk that the RFID reader 12 is reprogrammed with unauthorized programming. The administrator change signature is subsequently stored in the administrator change signature subsection 40 of each administrator transponder 14, 16, 18, containing the administrator change. An exemplary administrator change is a change to one or more of the encryption keys of the RFID system 10.

Once all the desired new data (i.e., programming revision identifier, programming segment identifier, new reader programming, new programming signature, administrator change, and administrator change signature) has been written to the administrator transponders 14, 16, 18, the system administrator can initiate communication between the administrator transponders 14, 16, 18 and the RFID reader 12. However, in accordance with a preferred embodiment, the new data-containing administrator transponders 14, 16, 18 are first collated and lodged as a sorted card bundle in a transponder retention assembly 42 (shown in FIG. 1), such as a wallet or the like. This reduces the risk to the system administrator of losing one or more of the administrator transponders 14, 16, 18 or of inadvertently forgetting to present one or more of the administrator transponders 14, 16, 18 to the RFID reader 12 during practice of the initiation mode.

Communication between the administrator transponders 14, 16, 18 and the RFID reader 12 is initiated by positioning the administrator transponders 14, 16, 18 within the communication range 22 of the RFID reader 12. If the administrator transponders 14, 16, 18 are retained in a transponder retention assembly 42, this step is accomplished simply by positioning the transponder retention assembly 42 proximal to the RFID reader 12 without removing the administrator transponders 14, 16, 18 from the transponder retention assembly 42.

It can be advantageous to modify certain elements of each administrator transponder relative to the other administrator transponders so that the coupling of each administrator transponder 14, 16, 18 to the RFID reader 12 is dependent on the position of the given administrator transponder 14, 16, 18 relative to the RFID reader 12. This is particularly advantageous when the administrator transponders 14, 16, 18 are presented to the RFID reader 12 as a sorted card bundle within the transponder retention assembly 42 and, more particularly, when an even larger number of administrator transponders are required for the initiation mode. In the present example, the tuning capacitor of each administrator transponder 14, 16, 18 could be adjusted to eliminate the advantage that the first administrator transponder 14 has over the second or third administrator transponders 16, 18 due to its more proximal location to the RFID reader 12 when the administrator transponders 14, 16, 18 are communicating with the RFID reader 12.

When a plurality of administrator transponders are used, it is also advantageous to eliminate collisions between transponder data signals simultaneously transmitted by two or more of the administrator transponders. This is achieved in the present example where the administrator transponders 14, 16, 18 are smart cards operating at 13.56 MHz by applying ISO standards 15693 and 14443, which define an anticollision protocol and a transponder selection protocol for transmissions from a plurality of smart cards.

The administrator transponders 14, 16, 18 communicate with the RFID reader 12 in a conventional manner to write all of the new data in its entirety to the memory of the RFID reader 12. Writing the new data to the RFID reader 12 effectively enables the RFID reader 12 to reprogram itself with the new programming and administrator changes, if any, in their entirety. Once the RFID reader 12 is reprogrammed with the new data in its entirety, the RFID reader 12 is termed a reprogrammed RFID reader and the system reprogramming initiation mode of operation is essentially completed. In most cases, the entirety of the new data completely replaces all of the old data in the reprogrammed RFID reader so that no old data remains in the reprogrammed RFID reader after full reprogramming. However, in some cases, the reprogrammed RFID reader can retain old data even after the RFID reader has been reprogrammed if the entirety of the new data is not intended to replace all of the old data.

In the typical case, the RFID system 10 further comprises a plurality of RFID readers and user transponders in addition to the first RFID reader 12 and administrator transponders 14, 16, 18 shown in FIG. 1. FIG. 3 shows a more expansive representation of the RFID system 10 than shown in FIG. 1, wherein additional components of the RFID system 10, namely additional RFID readers and user transponders, are combined with the components of FIG. 1 to perform the system reprogramming propagation mode of operation upon completion of the system programming initiation mode. Components common to both FIGS. 1 and 3 are designated in FIG. 3 by the same reference characters used in FIG. 1.

The RFID system 10 shown in FIG. 3, by way of example, further comprises a plurality of RFID readers, namely a second RFID reader 44, a third RFID reader 46, and a fourth RFID reader 48. The additional second, third and fourth RFID readers 44, 46, 48 are essentially identical in structure and function to the first RFID reader 12, but have not yet been reprogrammed. Therefore, upon completion of the initiation mode, each additional RFID reader 44, 46, 48, is termed an unreprogrammed RFID reader, i.e., an RFID reader which does not contain any new data. It is desirable to continue the present reprogramming method upon completion of the initiation mode by performing the propagation mode of operation, wherein all of the remaining RFID readers 44, 46, 48 are reprogrammed. As such, the propagation mode reprograms the remaining RFID readers 44, 46, 48 of the RFID system 10 by effectively and rapidly propagating the new data throughout all of the RFID readers 44, 46, 48 to securely repopulate each of them with the new data.

In accordance a first embodiment of the propagation mode, all the remaining RFID readers 44, 46, 48 are reprogrammed individually by the system administrator at each respective RFID reader location using the administrator transponders 14, 16, 18 in essentially the same manner as described above with respect to the initiation mode and the first RFID reader 12. However, in accordance with an alternate second embodiment of the propagation mode, at least some, if not all, of the remaining RFID readers 44, 46, 48 are preferably reprogrammed by a plurality of system users themselves during normal usage of user transponders. In accordance with the example of FIG. 3, the RFID system 10 further comprises a first user transponder 50, a second user transponder 52, and a third user transponder 54. During both the initiation and propagation modes of operation, it is an advantageous and preferred feature of the present invention that all the RFID readers 12, 44, 46, 48 of the RFID system 10 have the ability to distinguish between the administrator transponders 14, 16, 18 and the user transponders 50, 52, 54. It is also a preferred feature that all the RFID readers 12, 44, 46, 48 of the RFID system 10 have the ability to identify non-system transponders (not shown) using the above-recited security features to prevent invalid programming from being programmed into the RFID readers 12, 44, 46, 48.

In accordance with the second embodiment of the propagation mode, wherein at least some of the remaining unreprogrammed RFID readers 44, 46, 48 are reprogrammed using the user transponders 50, 52, 54, the memory of each user transponder 50, 52, 54 preferably has essentially the same configuration as the others. A representation of a portion of the memory of the first user transponder 50 is generally designated 56 and described hereafter with reference to FIG. 4, it being understood that this description applies equally to essentially all the remaining user transponders 52, 54 in the RFID system 10. Conceptually, the memory 56 of the first user transponder 50 is compartmentalized into a plurality of sections and subsections, which essentially correspond to the memory 24 of the administrator transponder 14. As such, corresponding sections and subsections of the memory 56 of the user transponder 50 are designated by the same reference characters as the memory 24 of the administrator transponder 14 shown in FIG. 2. However, the memory 56 of the user transponder 50 is distinguishable from the memory 24 of the administrator transponder 14 in that the user memory 56 includes a section 58 which is not included in the administrator memory 24.

The section 58 is a user identification section, which contains read-only data and/or rewritable data specific to an authorized person who has been designated to control and use the user transponder 50. The user identification data stored in the user identification section 58 of the user transponder 50 is preferably current at all times during operation of the RFID system 10. However, the revision identification and propagation section 26 and the content and security section 28 of the user memory 56 initially contain old data at the outset of the propagation mode, which differs from (and often predates) the new data stored in the administrator memory 24 of the administrator transponders 14, 16, 18 and the memory of the first RFID reader 12.

The propagation mode begins when a user transponder (e.g. the first user transponder 50) communicates with the reprogrammed first RFID reader 12 immediately upon completion of the initiation mode during normal use of the RFID system 10 (e.g., when a user positions the first user transponder 50 within the communication range of the first RFID reader 12 during an access control application). The first RFID reader 12 sees the old programming revision identifier (e.g., "3") in the programming revision identifier subsection 30 of the user memory 56 of the first user transponder 50. The first RFID reader 12 recognizes the old programming revision identifier "3" as different from the new programming revision identifier (e.g., "4") stored in the memory of the first RFID reader 12, which causes the first RFID reader 12 to replace the old reader programming stored in the programming segment content subsection 34 of the first user transponder 50 with a segment of the new reader programming stored in the memory of the first RFID reader 12.

The particular segment of the new reader programming which is written by the first RFID reader 12 to the programming segment content subsection 34 of the first user transponder 50 is determined by the data in the programming segment request subsection 32 of the first user transponder 50 in a manner described hereafter. However, in the absence of any data in the programming segment request subsection 32, the first RFID reader 12 selects the particular segment of the new reader programming to write to the first user transponder 50 in accordance with any number of alternate selection procedures. For example, in the absence of any data in the programming segment request subsection 32, the segment selection procedure may be fixed, wherein the first RFID reader 12 writes the same segment of the new reader programming (e.g., the first segment "1 of 3") to every user transponder with which the first RFID reader 12 communicates. Alternatively, the segment selection procedure may be sequential, wherein the first RFID reader 12 writes the first segment of the new reader programming (e.g., "1 of 3") to the initial user transponder with which the first RFID reader 12 communicates, the second segment of the new reader programming (e.g., "2 of 3") to the next user transponder with which the first RFID reader 12 communicates, and so on, repeating this sequence once all the segments have been written. In another alternative, the selection procedure may be random or pseudo random, wherein the first RFID reader 12 randomly or pseudo randomly selects a segment of the new reader programming for writing to each and every user transponder with which the first RFID reader 12 communicates.

In any case, once the first RFID reader 12 writes the selected segment of the new reader programming (e.g., the first segment "1 of 3") to the programming segment content subsection 34 of the first user transponder 50, the first RFID reader 12 likewise updates the other subsections of the revision identification and propagation section 26 and the content and security section 28 of the user memory 56 of the first user transponder 50 with new data as appropriate. In particular, the first RFID reader 12 replaces the now-outdated old programming revision identifier (e.g., "3") in the programming revision identifier subsection 30 of the revision identification and propagation section 26 with the new programming revision identifier (e.g., "4") previously written to the first RFID reader 12 by the administrator transponders 14, 16, 18. Updating the content and security section 28 comprises replacing the now-outdated old data in the remaining respective subsections 36, 38, 40 with new data previously written to the first RFID reader 12 by the administrator transponders 14, 16, 18.

It is noted that in some cases the user memory 56 of the first user transponder 50 may be empty rather than containing old data. If the user memory 56 is empty for any reason when the first user transponder 50 communicates with the reprogrammed first RFID reader 12 during normal use, the first RFID reader 12 recognizes the user memory 56 as empty and automatically writes the new data in its entirety to the user memory 56 of the first user transponder 50 to update the user memory 56.

When the first user transponder 50 having the updated user memory 56, subsequently communicates during normal use with an unreprogrammed RFID reader 44, 46, 48 of the RFID system 10 (e.g., the second RFID reader 44), the second RFID reader 44 sees the new programming revision identifier in the programming revision identifier subsection 30 of the user memory 56 and recognizes the new programming revision identifier "4" as different from the old programming revision identifier "3" stored in the memory of the second RFID reader 44. Therefore, the second RFID reader 44 writes the specific segment of the new programming "1 of 3" stored in the programming segment content subsection 34 of the first user transponder 50 to the memory of the second RFID reader 44. The second RFID reader 44 is termed "partially written to" at this point in the propagation mode insofar as one or more, but not all, of the segments of the new reader programming have been written to the memory of the second RFID reader 44 by the user transponders.

Another user transponder, such as the second user transponder 52, which has not yet communicated with the reprogrammed first RFID reader 12 and does not contain any new data, can communicate with the partially written to second RFID reader 44 after the first user transponder 50 during normal use of the RFID system 10. The second RFID reader 44 also sees the old programming revision identifier "3" in the programming revision identifier subsection 30 of the user memory 56 of the second user transponder 52, which causes the second RFID reader 44 to replace the old reader programming stored in the programming segment content subsection 34 of the second user transponder 52 with the segment of the new reader programming "1 of 3" obtained from the first user transponder 50 and stored in the memory of the second RFID reader 44.

In some cases, the second user transponder 52 has already communicated with the reprogrammed first RFID reader 12 and contains new data including a selected segment of the new reader programming, when the second user transponder 52 communicates with the partially written to second RFID reader 44 during normal use of the RFID system 10. If the selected segment of the new reader programming (e.g., "2 of 3") in the user memory 56 of the second user transponder 52 is recognized by the second RFID reader 44 as being different from the segment of the new reader programming "1 of 3" written to the memory of the second RFID reader 44 by the first user transponder 50, the second RFID reader 44 writes the selected segment of the new reader programming "2 of 3" in the user memory 56 of the second user transponder 52 to the memory of the second RFID reader 44.

It is apparent that if enough communication episodes occur between the user transponders and the second RFID reader 44, all of the segments of the new reader programming stored in the memory of the reprogrammed first RFID reader 12 will be written to the memory of the second RFID reader 44 in the above-described manner. Substantially the same procedure is likewise used to write all of the administrator changes, if any, to the second RFID reader 44. It is apparent that all of the segments of the new reader programming stored in the memory of the reprogrammed first RFID reader 12 and all of the administrator changes, if any, can be written to the third and fourth RFID readers 46, 48 in the RFID system 10 using substantially the same procedure as recited above with respect to the second RFID reader 44.

Reprogramming of the multiple additional RFID readers 44, 46, 48 in the RFID system 10 during the propagation mode of operation can be expedited by use of the programming segment request subsection 32 in each of the user transponders 50, 52, 54. Reference is made by way of example to the case where the second user transponder 52 has already communicated with the reprogrammed first RFID reader 12 and contains new data and is presently communicating with the partially written to second RFID reader 44 during normal use. If the selected segment of the new reader programming in the user memory 56 of the second user transponder 52 is recognized by the second RFID reader 44 as being the same (e.g., "1 of 3") as the segment of the new reader programming "1 of 3" written to the memory of the second RFID reader 44 by the first user transponder 50, the second RFID reader 44 writes a programming segment request into the programming segment request subsection 32 of the user memory 56 of the second user transponder 52, but does not write any data from the second user transponder 52 to the memory of the second RFID reader 44.

The programming segment request corresponds to the programming segment identifier of any segment of the new reader programming which has not yet been written to the memory of the second RFID reader 44 (e.g., "2 of 3" or "3 of 3"). If multiple segments of new reader programming are needed by the second RFID reader 44, the second RFID reader 44 preferably pseudo randomly selects the programming segment identifier to thwart any malicious users attempting to prevent reprogramming.

When the second user transponder 52 communicates with a partially written to or reprogrammed RFID reader (for example, the first RFID reader 12) during normal use, the first RFID reader reads the programming segment request (e.g., "2 of 3") in the programming segment request subsection 32 of the user memory 56 of the second user transponder 52. If the first RFID reader 12 contains the requested programming segment (which it does in the present example, since the first RFID reader 12 contains all of the segments of new reader programming), the first RFID reader writes the requested programming segment "2 of 3" to the programming segment content subsection 34 of the user memory 56 of the second user transponder 52.

When the second user transponder 52 containing the requested programming segment "2 of 3" in the programming segment content subsection 34 of the user memory 56 communicates again with the second RFID reader 44 during normal use, the second RFID reader 44 recognizes the requested programming segment "2 of 3" as being needed to further supplement the one or more segments of the new reader programming stored in the memory of the second RFID reader 44. Therefore, the second RFID reader 44 writes the requested programming segment "2 of 3" to the memory of the second RFID reader 44.

Once all of the new data is written to each of the additional RFID readers 44, 46, 48, each RFID reader 44, 46, 48 reprograms itself with the new reader programming and administrator changes, if any, in their entirety. Since the new data is written to each RFID reader essentially independent of the other RFID readers in the RFID system 10, it is apparent that not all of the remaining RFID readers 44, 46, 48 will obtain the new data in its entirety at the same time. Therefore, it is neither a requirement nor likely that all of the RFID readers 44, 46, 48 will reprogram themselves simultaneously, but will more likely reprogram themselves sequentially. In any case, the system reprogramming propagation mode of operation and the present reprogramming method in sum are completed once all of the RFID readers 12, 44, 46, 48 of the RFID system 10 have been reprogrammed. Thus, the propagation mode permits reprogramming of all the RFID readers of an RFID system over time by normal use of the user transponders in the RFID system once at least one RFID reader of the RFID system has been reprogrammed using administrator transponders.

It is further within the scope of the present invention to provide the system administrator with alternate discretionary control options for controlling (at least to some extent) if and when reprogramming of the remaining RFID readers of the RFID system occurs once the first RFID reader has been reprogrammed. One control option is to provide the system administrator the ability to block all writing of new data to the remaining RFID readers via the user transponders during normal use of the RFID system. In accordance with this option, if it is desired to reprogram any of the remaining RFID readers, the system administrator must reprogram them individually using the administrator transponders in the same manner as with the first RFID reader. Another control option available if all of the remaining RFID readers have a real time clock is to provide the system administrator with the discretion to permit reprogramming of the remaining RFID readers only at certain times.

In the absence of real time clocks for the RFID readers, a further control option is to permit reprogramming of the remaining RFID readers for a limited time after power to the RFID readers is turned off. Another control option is to permit reprogramming of the remaining RFID readers when the RFID reader has not been used for a predetermined period of time. This option reduces the chance that a user will not attempt to use the RFID reader while it is reprogramming itself with the new reader programming. Still another control option is to create a special transponder having a key which is only used when reprogramming RFID readers. Reprogramming is permitted for a limited time period only when the RFID reader authenticates the special transponder using the transponder key.

Although the present invention has been described above as a method for reprogramming RFID readers within an RFID system, the invention is not limited to reprogramming applications. It is also readily apparent to one skilled in the art that the present invention is further adaptable as a method for initially programming one or more RFID readers within an RFID system, wherein the RFID reader has not yet been programmed for the first time or does not otherwise contain any old reader programming. In accordance with this embodiment, the terms new reader programming and programming revision identifier are replaced with the terms initial reader programming and initial programming identifier, respectively, to more accurately characterize a method for programming an RFID reader with initial reader programming rather than with new reader programming which replaces old reader programming.

The present invention has also been described above, wherein the administrator transponders and the user transponders have different memory configurations. It is alternately within the scope of the present invention to employ administrator transponders having the same memory configuration as the user transponders. In accordance with this embodiment, the memory of the administrator transponder is provided with a user identification section, but the RFID reader which is being reprogrammed by the administrator transponder preferably ignores the user identification data during reprogramming so that the user identification section performs essentially no required function during reprogramming.

The present invention has been further described above in specific embodiments as writing the new data to the memory of the RFID reader, which is preferably contained within the microcontroller. It is understood that the memory of the RFID reader is not limited to memory physically contained within the microcontroller, but includes memory physically external to the microcontroller which is accessible by the microcontroller during practice of the present method. Furthermore, it is generally within the scope of the present invention to write the new data to any other reader memory within and/or used by the RFID reader so long as the memory can be accessed by the RFID reader to reprogram itself with the new data after the new data has been written to the memory in the manner of the present invention.

The present invention has been still further described above as employing transponders and, more particularly, administrator and user transponders. The term transponder has been described above as preferably encompassing smart cards. It is noted that, within the scope of the present invention, the term transponder additionally encompasses devices which functionally mimic smart cards, such as cell phones, PDA's and laptop computers, by using the same or similar RF frequencies, modulations and protocols.

While the forgoing preferred embodiments of the invention have been described and shown, it is understood that alternatives and modifications, such as those suggested and others, may be made thereto and fall within the scope of the invention.

We claim:

1. A radio frequency identification (RFID) system comprising:
    an RFID reader storing old reader programming;
    new reader programming having a new revision identifier correlated thereto, wherein said new reader programming is divided into a plurality of segments, each segment of new reader programming having a programming segment identifier correlated thereto;
    a plurality of administrator transponders, each having an administrator transponder memory including a revision identification and propagation section and a segment content and security section, said revision identification and propagation section storing said new revision identifier, said segment content and security section of each said administrator transponder memory of said plurality of administrator transponders storing a different segment of new reader programming and each said administrator transponder memory storing said programming segment identifier correlated to said stored segment of new reader programming, wherein a sufficient number of administrator transponders are provided such that all said segments of new reader programming are stored in said plurality of administrator transponders; and
    means for writing said segment of new reader programming stored in said administrator transponder memory to said RFID reader in response to said RFID reader reading said new revision identifier, thereby enabling said RFID reader to reprogram itself with said new reader programming.

2. The RFID system of claim 1, wherein said means for writing said segment of new reader programming to said RFID reader includes an administrator transponder antenna and an RFID reader antenna.

3. The RFID system of claim 1, wherein said segment content and security section further stores a programming signature.

4. The RFID system of claim 1, wherein said segment content and security section further stores an administrator change.

5. The RFID system of claim 1, wherein said segment content and security section further stores an administrator change signature.

6. The RFID system of claim 1, wherein said administrator transponder memory is substantially devoid of any user identification data.

7. The RFID system of claim 1, wherein said revision identification and propagation section further stores a programming segment request correlated to one of said plurality of segments of new programming.

8. The RFID system of claim 1 further comprising a plurality of user transponders, each having a user transponder memory including a user identification section storing user identification data, a revision identification and propagation section, and a segment content and security section.

9. The RFID system of claim 8 further comprising at least one additional RFID reader storing said old programming and means for writing one segment of new reader programming stored in said segment content and security section of said user transponder memory to said additional RFID reader in response to said additional RFID reader reading said new revision identifier and said correlated programming segment identifier stored in said user transponder memory, thereby enabling said additional RFID reader to reprogram itself with said new reader programming.

10. The RFID system of claim 9 further comprising means for writing a programming segment request correlated to one of said plurality of segments of new programming to said revision identification and propagation section of said user transponder memory in response to said additional RFID reader comparing said programming segment identifier stored in said user transponder memory and said programming segment identifier stored in said additional RFID reader.

11. The RFID system of claim 10, wherein said means for writing said programming segment request to said user transponder memory includes a user transponder antenna and an additional RFID reader antenna.

12. The RFID system of claim 10 further comprising means for writing said segment of new reader programming correlated to said programming segment request and stored in said RFID reader to said user transponder memory in response to said RFID reader comparing said programming segment identifier stored in said RFID reader and said programming segment request stored in said user transponder memory.

13. The RFID system of claim 12, wherein said means for writing said segment of new reader programming correlated to said programming segment request to said user transponder memory includes a user transponder antenna and an RFID reader antenna.

14. The RFID system of claim 8, wherein said user transponder is a smart card.

15. The RFID system of claim 8, wherein said user transponder is a device functionally mimicking a smart card.

16. The RFID system of claim 1 further comprising at least one additional RFID reader storing said old programming and means for writing said segment of new reader programming stored in said administrator transponder memory to said additional RFID reader in response to said additional RFID reader reading said new revision identifier and said correlated programming segment identifier, thereby enabling said additional RFID reader to reprogram itself with said new reader programming.

17. The RFID system of claim 16, wherein said means for writing said segment of new reader programming to said additional RFID reader includes an administrator transponder antenna and an additional RFID reader antenna.

18. The RFID system of claim 1, wherein said administrator transponder is a smart card.

19. The RFID system of claim 1, wherein said administrator transponder is a device functionally mimicking a smart card.

20. A radio frequency identification (RFID) system comprising:
a first RFID reader storing old reader programming;
new reader programming having a new revision identifier correlated thereto, wherein said new reader programming is divided into a plurality of segments, each segment of new reader programming having a programming segment identifier correlated thereto;
a plurality of RFID administrator transponders, each having an administrator transponder memory including a revision identification and propagation section and a segment content and security section, said revision identification and propagation section storing said new revision identifier, said segment content and security section of each of said plurality of RFID administrator transponders storing a different segment of new reader programming, and said administrator transponder memory storing said programming segment identifier correlated to said stored segment of new reader programming;
first writing means for writing said new revision identifier, said segment of new reader programming and said correlated programming segment identifier stored in said administrator transponder memory to said first RFID reader, thereby enabling said first RFID reader to reprogram itself with said new reader programming;
one or more additional RFID readers storing said old reader programming;
a plurality of user transponders, each having a user transponder memory including a user identification section storing user identification data, a revision identification and propagation section, and a segment content and security section;
second writing means for writing said new revision identifier stored in said first RFID reader to said revision identification and propagation section of said user transponder memory, for writing one of said plurality of segments of new reader programming stored in said first RFID reader to said segment content and security section of said user transponder memory, and forwriting said correlated programming segment identifier stored in said first RFID reader to said user transponder memory;
third writing means for writing said segment of new reader programming stored in said user transponder memory to said one or more additional RFID readers in response to said one or more additional RFID readers reading said new revision identifier and said correlated programming segment identifier, thereby enabling each of said one or more additional RFID readers to reprogram itself with said new reader programming.

21. The RFID system of claim 20, wherein said first writing means includes an administrator transponder antenna and a first RFID reader antenna.

22. The RFID system of claim 20, wherein said second writing means includes a user transponder antenna and a first RFID reader antenna.

23. The RFID system of claim 20, wherein said third writing means includes a user transponder antenna and an additional RFID reader antenna.

24. The RFID system of claim 20, wherein said third writing means is further for writing a programming segment request correlated to one of said plurality of segments of new programming to said revision identification and propagation section of said user transponder memory in response to said one or more additional RFID readers comparing said programming segment identifier stored in said user transponder memory and said programming segment identifier stored in said one or more additional RFID readers.

25. The RFID system of claim 24 wherein said second writing means is further for writing said segment of new reader programming correlated to said programming segment request and stored in said first RFID reader to said user transponder memory in response to said first RFID reader comparing said programming segment identifier stored in said first RFID reader and said programming segment request stored in said user transponder memory.

26. The RFID system of claim 20, wherein said administrator and/or user transponder is a smart card.

27. The RFID system of claim 20, wherein said administrator and/or user transponder is a device functionally mimicking a smart card.

28. A method for reprogramming a radio frequency identification (RFID) reader in an RFID system comprising:
storing old reader programming in a first RFID reader;
providing new reader programming having a new revision identifier correlated thereto, said new reader programming divided into a plurality of segments, each segment of new reader programming having a programming segment identifier correlated thereto;
storing said new revision identifier, said plurality of segments of new reader programming, and said correlated programming segment identifiers in a plurality of administrator transponders, wherein said new revision identifier and a different programming segment and correlated programming segment identifier are stored in each of said plurality of administrator transponders, and further wherein a sufficient number of administrator transponders are provided to store all said segments of new reader programming in said plurality of administrator transponders;
reading said new revision identifier stored in each of said plurality of administrator transponders with said first RFID reader; and
writing each programming segment and correlated programming segment identifier stored in each of said plurality of administrator transponders to said first RFID reader in response to said first RFID reader reading said new revision identifier, thereby reprogramming said first RFID reader with said new reader programming.

29. The method of claim 28 further comprising storing user identification data in a user transponder and writing said new revision identifier, one of said plurality of segments of new reader programming, and said correlated programming segment identifier stored in said first RFID reader to said user transponder.

30. The method of claim 29 further comprising writing said segment of new reader programming and said correlated programming segment identifier stored in said user transponder to a second RFID reader in response to said second RFID reader reading said new revision identifier and said correlated programming segment identifier.

31. The method of claim 30 further comprising repeating said user transponder writing step to write said new revision identifier, a different one of said plurality of segments of new reader programming, and said correlated programming segment identifier to said same user transponder or a different user transponder and repeating said second RFID reader writing step to write said different stored segment of new reader programming and said correlated programming segment identifier to said second RFID reader.

32. The method of claim 31 further comprising repeating said user transponder and second RFID reader writing steps until all said segments of new reader programming are written to said second RFID reader, thereby reprogramming said second RFID reader with said new reader programming.

33. The method of claim 29 further comprising writing a programming segment request correlated to one of said plurality of segments of new programming to said user transponder in response to a second RFID reader comparing said programming segment identifier stored in said user transponder and a programming segment identifier stored in said second RFID reader.

34. The method of claim 33 further comprising writing said segment of new reader programming correlated to said programming segment request and stored in an other RFID reader of said RFID system other than said second RFID reader to said user transponder in response to said other RFID reader comparing a programming segment identifier stored in said other RFID reader and said programming segment request stored in said user transponder.

35. The method of claim 34 further comprising writing said segment of new reader programming correlated to said programming segment request stored in said user transponder to said second RFID reader.

36. The method of claim 28, wherein said administrator transponder is a smart card.

37. The method of claim 28, wherein said administrator transponder is a device functionally mimicking a smart card.

38. The method of claim 29, wherein said user transponder is a smart card.

39. The method of claim 29, wherein said user transponder is a device functionally mimicking a smart card.

40. A method for reprogramming a radio frequency identification (RFID) reader in an RFID system comprising:
storing old reader programming in a first RFID reader
providing new reader programming having a new revision identifier correlated thereto, said new reader programming divided into a plurality of segments, each segment of new reader programming having a programming segment identifier correlated thereto;
storing said new revision identifier, said plurality of segments of new reader programming, and said correlated programming segment identifiers in a plurality of administrator transponders, wherein said new revision identifier and a different programming segment and correlated programming segment identifier are stored in each of said plurality of administrator transponders;
reading said new revision identifier stored in each of said plurality of RFID transponders with said first RFID reader;

writing each programming segment and correlated programming segment identifier stored in each of said plurality of RFID administrator transponders to said first RFID reader in response to said first RFID reader reading said new revision identifier, thereby reprogramming said first RFID reader with said new reader programming;

writing a programming segment request correlated to one of said plurality of segments of new programming correlated to a programming segment identifier to a user transponder in response to a second RFID reader comparing a programming segment identifier stored in said user transponder and a programming segment identifier stored in said second RFID reader;

writing said segment of new reader programming correlated to said programming segment request and stored in an other RFID reader of said RFID system other than said second RFID reader to said user transponder in response to said other RFID reader comparing a programming segment identifier stored in said other RFID reader and said programming segment request stored in said user transponder; and writing said segment of new reader programming correlated to said programming segment request stored in said user transponder to said second RFID reader.

41. The method of claim 40 further comprising repeating said programming segment request writing step to write a different programming segment request correlated to a different one of said plurality of segments of new reader programming not stored in said second RFID reader to said user transponder, repeating said step of writing said segment of new reader programming correlated to said programming segment request to write said different segment of new reader programming not stored in said second RFID reader to said user transponder, and repeating said step of writing said segment of new reader programming correlated to said programming segment request to write said different segment of new reader programming stored in said user transponder to said second RFID reader.

42. The method of claim 41 further comprising repeating said programming segment request writing step and said steps of writing said segment of new reader programming correlated to said programming segment request to said user transponder and to second RFID reader until all said segments of new reader programming are written to said second RFID reader, thereby reprogramming said second RFID reader with said new reader programming.

43. The method of claim 40, wherein said administrator and/or user transponder is a smart card.

44. The method of claim 40, wherein said administrator and/or user transponder is a device functionally mimicking a smart card.

45. A method for programming a radio frequency identification (RFID) reader in an RFID system comprising:

providing reader programming having a programming identifier correlated thereto and divided into a plurality of segments, each segment of reader programming having a programming segment identifier correlated thereto;

storing said programming identifier, said plurality of segments of reader programming and said correlated programming segment identifiers in a plurality of administrator transponders, wherein said programming identifier, a different programming segment and correlated programming segment identifier are stored in each of said plurality of administrator transponders, and further wherein a sufficient number of administrator transponders are provided to store all said segments of reader programming in said plurality of administrator transponders;

reading said programming identifier stored in each of said plurality of administrator transponders with a first RFID reader;

writing said programming identifier to said first RFID reader; and writing each programming segment and correlated programming segment identifier stored in each of said plurality of administrator transponders to said first RFID reader, thereby programming said first RFID reader with said reader programming.

46. The method of claim 45, wherein said reader programming is initial reader programming.

47. The method of claim 45 further comprising storing user identification data in a user transponder and writing said one of said plurality of segments of reader programming and said correlated programming segment identifier stored in said first RFID reader to said user transponder.

48. The method of claim 47 further comprising writing said segment of reader programming and said correlated programming segment identifier stored in said user transponder to a second RFID reader.

49. The method of claim 47 further comprising repeating said user transponder writing step to write a different one of said plurality of segments of reader programming, and said correlated programming segment identifier to said same user transponder or a different user transponder and repeating said second RFID reader writing step to write said different stored segment of reader programming and said correlated programming segment identifier to said second RFID reader.

50. The method of claim 49 further comprising repeating said user transponder and second RFID reader writing steps until all said segments of reader programming are written to said second RFID reader, thereby programming said second RFID reader with said reader programming.

* * * * *